(12) United States Patent
Miranda et al.

(10) Patent No.: US 9,844,842 B2
(45) Date of Patent: Dec. 19, 2017

(54) SCAFFOLDING CLIP AND APPLICATOR

(71) Applicants: Stephen Alfred Miranda, Daisy Hill (AU); Edward Smith, Highland Park (AU); Nigel Rose, Broadbeach Waters (AU)

(72) Inventors: Stephen Alfred Miranda, Daisy Hill (AU); Edward Smith, Highland Park (AU); Nigel Rose, Broadbeach Waters (AU)

(73) Assignee: Mass Electronics Pty Ltd, Eight Mile Plains, QLD (AU)

(*) Notice: Subject to any disclaimer, the term of this patent is extended or adjusted under 35 U.S.C. 154(b) by 623 days.

(21) Appl. No.: 14/082,332

(22) Filed: Nov. 18, 2013

(65) Prior Publication Data

US 2014/0075731 A1 Mar. 20, 2014

Related U.S. Application Data

(62) Division of application No. 13/319,104, filed on Nov. 18, 2011, now abandoned.

(51) Int. Cl.
*B23P 11/00* (2006.01)
*E04G 5/12* (2006.01)
*F16B 2/24* (2006.01)

(52) U.S. Cl.
CPC ............... *B23P 11/00* (2013.01); *E04G 5/12* (2013.01); *F16B 2/248* (2013.01); *Y10T 29/4995* (2015.01); *Y10T 29/49817* (2015.01); *Y10T 29/49959* (2015.01)

(58) Field of Classification Search
CPC .... F16B 2/248; F16B 2/24; F16B 5/06; E04G 5/12; Y10T 29/49817; Y10T 29/49959; Y10T 29/4995; Y10T 29/53783; Y10T 29/53909; B25B 27/20; E21C 35/197; E21C 35/1826
See application file for complete search history.

(56) References Cited

U.S. PATENT DOCUMENTS

| | | | |
|---|---|---|---|
| 69,398 A | 10/1867 | Britton | |
| 2,907,553 A * | 10/1959 | Cookman | E04H 17/10 256/48 |
| 5,316,247 A * | 5/1994 | Wodka | F16L 3/23 248/68.1 |
| 5,586,584 A * | 12/1996 | Haldemann | B21F 9/02 140/123.5 |

(Continued)

FOREIGN PATENT DOCUMENTS

| | | | | |
|---|---|---|---|---|
| CA | 2552013 A1 * | 1/2008 | | E04G 5/12 |
| IT | WO 2011055393 A1 * | 5/2011 | | E04G 5/12 |

*Primary Examiner* — Jacob Cigna
*Assistant Examiner* — Lee A Holly
(74) *Attorney, Agent, or Firm* — Bay State IP, LLC

(57) ABSTRACT

A scaffolding clip and a scaffolding clip applicator tool are provided for fastening a web, such as a retaining mesh, to a scaffolding pole. During use a preferred method includes holding the fastening clip with the applicator, locating the web between the pole and the fastening clip, piercing the web with opposed ends of the clip and disengaging the applicator from the clip. In order to subsequently remove the clip from the pole a loop of the clip is engaged by a catch of the applicator and levered from the pole with a heel of the applicator that extends from opposite the catch and acts as a fulcrum.

7 Claims, 12 Drawing Sheets

(56) References Cited

U.S. PATENT DOCUMENTS

| | | | | |
|---|---|---|---|---|
| 6,543,750 B1 * | 4/2003 | Calzone | ................ | E04H 17/20 |
| | | | | 256/1 |
| 8,407,875 B2 * | 4/2013 | Gray | ................ | B21F 15/00 |
| | | | | 140/123 |
| 8,490,262 B2 * | 7/2013 | Monyak | ................ | B25B 27/20 |
| | | | | 254/25 |
| 8,636,266 B2 * | 1/2014 | Gill | ................ | E04F 11/1855 |
| | | | | 256/24 |

* cited by examiner section A-A

SCAFFOLDING CLIP AND APPLICATOR

CROSS REFERENCE TO RELATED APPLICATION

This application is a Divisional application, and takes priority from and the benefit of U.S. patent application Ser. No. 13/319,104, the contents of which are herein incorporated by reference.

FIELD OF THE INVENTION

The present invention relates to method for attaching a web, such as a mesh to scaffolding. In a particular application the invention finds use for securing a web, such as a scaffolding mesh or other perimeter containment screening, to scaffolding poles and for removal of scaffold clips from scaffold poles.

BACKGROUND OF THE INVENTION

The installation of scaffolding is time consuming and labor intensive. Often scaffolding is erected to a substantial height. Consequently, a perimeter containment screen, such as a mesh or other webbing, is often fastened to the outside of scaffolding as a safety measure to reduce the likelihood of debris falling to the ground and injuring pedestrians.

At present a number of approaches are taken to secure the mesh to the scaffold. One approach is to use a "twist tie" being a bendable piece of wire. The tie is manually inserted through the mesh, thereby piercing it, maneuvered around a scaffold "standard (i.e. the vertical scaffolding pole) and pulled back out of the mesh. The free ends of the tie are then twisted together, thereby securing the mesh to the pole as shown in FIG. 1.

A further approach is to use a rigid "J" shaped metal guide having a concave profile. The guide is forced through the mesh, around the scaffold pole and back out of the mesh. A plastic cable tie is then pushed along the inside of the guide so that it encircles the pole and its ends are then fastened together. FIG. 2 shows this last arrangement during application whereby the J-shaped guide 1 has been pushed through a mesh 3, around pole 5 and back out through the mesh. A plastic cable tie 7 has then been pushed into one end of the guide so that it encircles the pole 5 with its free ends on the side of the mesh opposite the pole to be fastened together in order to secure the mesh to the pole 5.

It will be realized that both of the above described approaches to fastening mesh to the scaffolding pole are relatively finicky and time consuming. Where the work is being performed at a height it may also be dangerous since two hands may be required so that the worker must remove both hands from a support, such as ladder for example.

It is an object of the present invention to address the above described problem and to provide an improvement, or at least a useful alternative, for securing mesh to scaffolding, than has hitherto been known in the prior art.

SUMMARY OF THE INVENTION

According to a first aspect of the present invention there is provided method for fastening a web to a scaffolding pole including the steps of:
locating a fastening clip on a side of the web opposite the pole, the fastening clip having arms to hold the pole therebetween;
pushing the arms through the web and about opposite sides of the pole; and
holding the web to the scaffolding pole with the clip.

Preferably the method includes including holding the fastening clip with an applicator.

The step of holding the fastening clip with the applicator may include receiving an engagement formation of the fastening clip into a socket formed on an end of the applicator.

Preferably the method includes disengaging the applicator from the clip subsequent to piercing the web by application of sufficient force to the applicator to remove the socket from said portion of the clip without overcoming the holding of the web to the scaffolding with the arms.

The arms may be released from the pole to thereby release the web from the scaffolding pole.

Preferably the step of releasing the arms from the pole comprises levering the clip from the pole.

The step of levering the clip from the pole may include a step of inserting a hook of the applicator between the clip and the pole.

Preferably the step of levering the clip from the pole includes pivoting a portion of the applicator about the pole.

An elastomeric band may be disposed between the arms of the scaffolding clip for assisting in holding the web to the scaffolding pole with the arms.

Protective caps may be placed over ends of the arms subsequent to pushing the arms through the web.

According to a further aspect of the present invention there is provided a scaffolding clip
including;
opposed arms defining a void to receive a scaffolding pole;
opposed jaws continuous with respective opposed arms and defining a throat in communication with the void; and
an attachment formation for engagement with a scaffolding clip applicator.

Preferably the opposed jaws diverge outward from the throat. Alternatively, the opposed jaws may converge inward to the throat.

The attachment formation is preferably configured to bias the opposed arms together. For example it may be coiled. or necked to form a loop.

In a preferred embodiment the leading ends of the jaws are sharpened. for example pointed or provided with a knife edge. to assist in piercing mesh to be fastened to the scaffolding pole.

Preferably the attachment formation defines a space to receive a removal member.

For example the attachment formation may be a coil or loop that defines a space to receive a removal member such as a hook or a catch of a scaffolding clip applicator.

Preferably the opposed arms and opposed jaws are formed as a continuous piece.

Alternatively, the opposed arms may be provided as separate members, pivotally interconnected with a spring included that is arranged to bias the opposed arms together.

In a preferred embodiment of the invention the opposed arms are arcuate.

In another embodiment the opposed arms may include opposing angles. Such a configuration may be useful if the scaffolding pole has a square or rectangular cross section for example.

According to a further aspect of the invention there is
provided a scaffolding clip applicator arranged to apply
a scaffolding clip as described above, including:
an elongate handle;
an engagement formation at an end of said handle,
arranged to engage the attachment formation of the
scaffolding clip.
Preferably said applicator further includes;
a catch, for example a hook, toward said end, or an
opposing end, of the handle to engage the scaffold clip
attachment formation; and
a fulcrum fast with the handle for levering the clip away
from the pole.
Preferably the fulcrum comprises a heel extending outward from the handle and opposite the catch.
Preferably the catch comprises a hook.
In a preferred embodiment the engagement formation
comprises a socket arranged to hold the attachment
formation of the scaffolding clip.
According to a further aspect of the invention there is
provided a scaffolding clip kit including:
at least one scaffolding clip provided together with
a scaffolding clip applicator.
Preferably the kit includes at least one pair of tip protection caps.
The kit may further include one or more elastomeric
bands for assisting in fastening web to scaffolding
poles.
Preferably the kit includes a container, such as a bucket or
the like, to hold the clips, applicator, tip protection caps
and elastomeric bands.
According to another aspect of the invention, there is
provided a method for fastening a web to a scaffolding
pole including the steps of:
holding the fastening clip with an applicator;
locating the web between the pole and the fastening clip;
piercing the web with opposed ends of the clip;
disengaging the applicator from the clip.
The method may further include the steps of engaging a
portion of the clip opposite the opposed ends with a lever
and levering the clip off the pole.

Preferred features, embodiments and variations of the
invention may be discerned from the following detailed
description, which provides sufficient information for
those skilled in the art to perform the invention. The
detailed description is not to be regarded as limiting the
scope of the preceding Summary of the Invention in
any way. The detailed description will make reference
to a number of drawings throughout as follows.

BRIEF DESCRIPTION OF THE DRAWINGS

Like reference numbers are used throughout the figures to
refer to like items.

DETAILED DESCRIPTION OF PREFERRED
EMBODIMENTS

Figure 3:
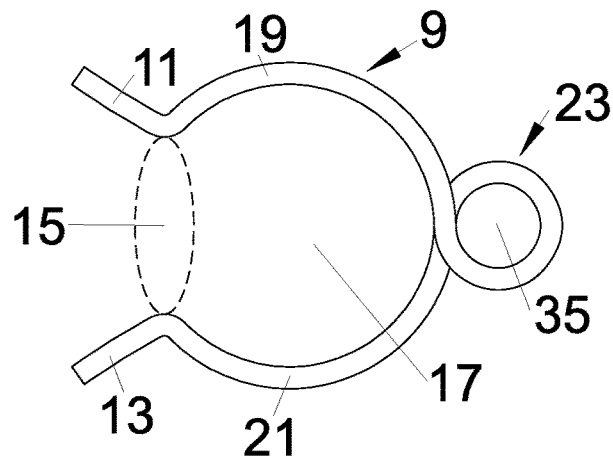
FIG. 3 depicts a scaffold clip according to a first embodiment of the invention.

Referring now to FIG. 3, there is shown in plan elevation
a scaffolding clip 9, according to a first embodiment of the
present invention. The clip 9 of the first embodiment is
formed from a single piece of sprung wire and shaped to
provide two outwardly diverging opposed jaws 11, 13 that
define a throat 15. The throat 15 leads into a pole void 17 for
receiving a scaffolding pole. The pole void 17 is defined by
opposing arcuate arms 19 and 21 continuous with jaws 11
and 13 respectively. A loop 23 of the wire is formed opposite
the throat 15. As will be explained, the loop 23 comprises an
attachment formation for engagement with an applicator
tool. In addition to acting as an attachment formation, the
loop of wire 23 also forms a biasing spring to oppose arms
21 and 19 being brought apart. The wire loop 23 also defines
an eye 35, which, as will be described later, receives a catch
in the form of a removal hook of the applicator for removal
of the clip from the pole 5. In an uninstalled resting state,
when no scaffolding pole is engaged, the pole void is
undersized relative to the outer diameter of the scaffolding
pole.

Figure 1:
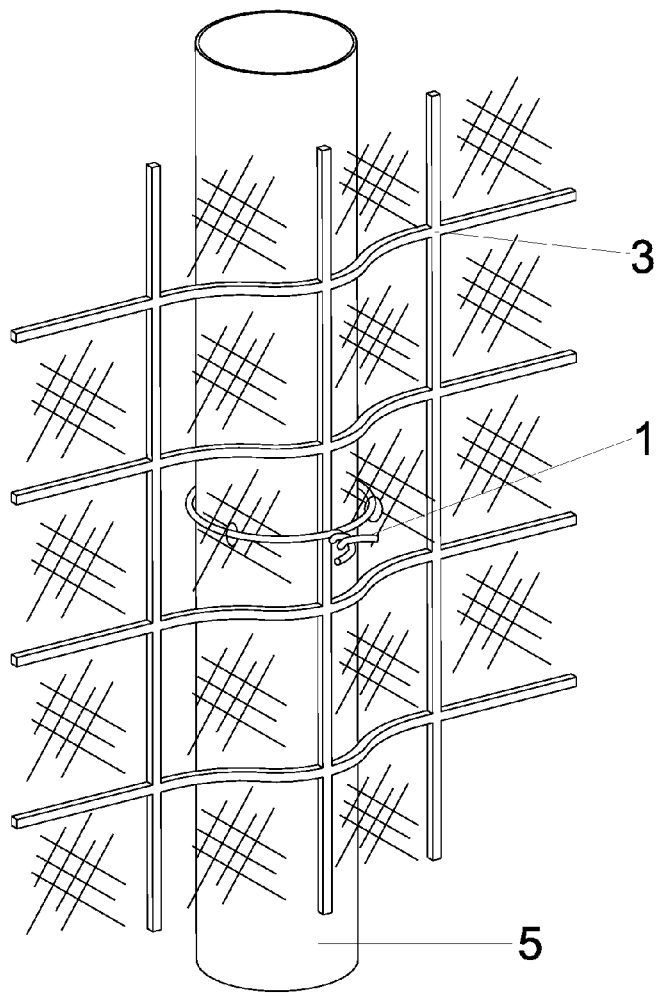
FIG. 1 depicts a wire tie being inserted through a mesh
and around a scaffolding pole in accordance with a fastening
system of the prior art.
Figure 5:
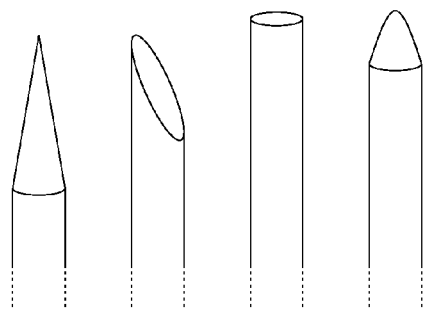
FIG. 5 is a close up of a number of examples of different
sharpened leading end shapes of a scaffolding clip according
to an embodiment of the invention.
Figure 2:
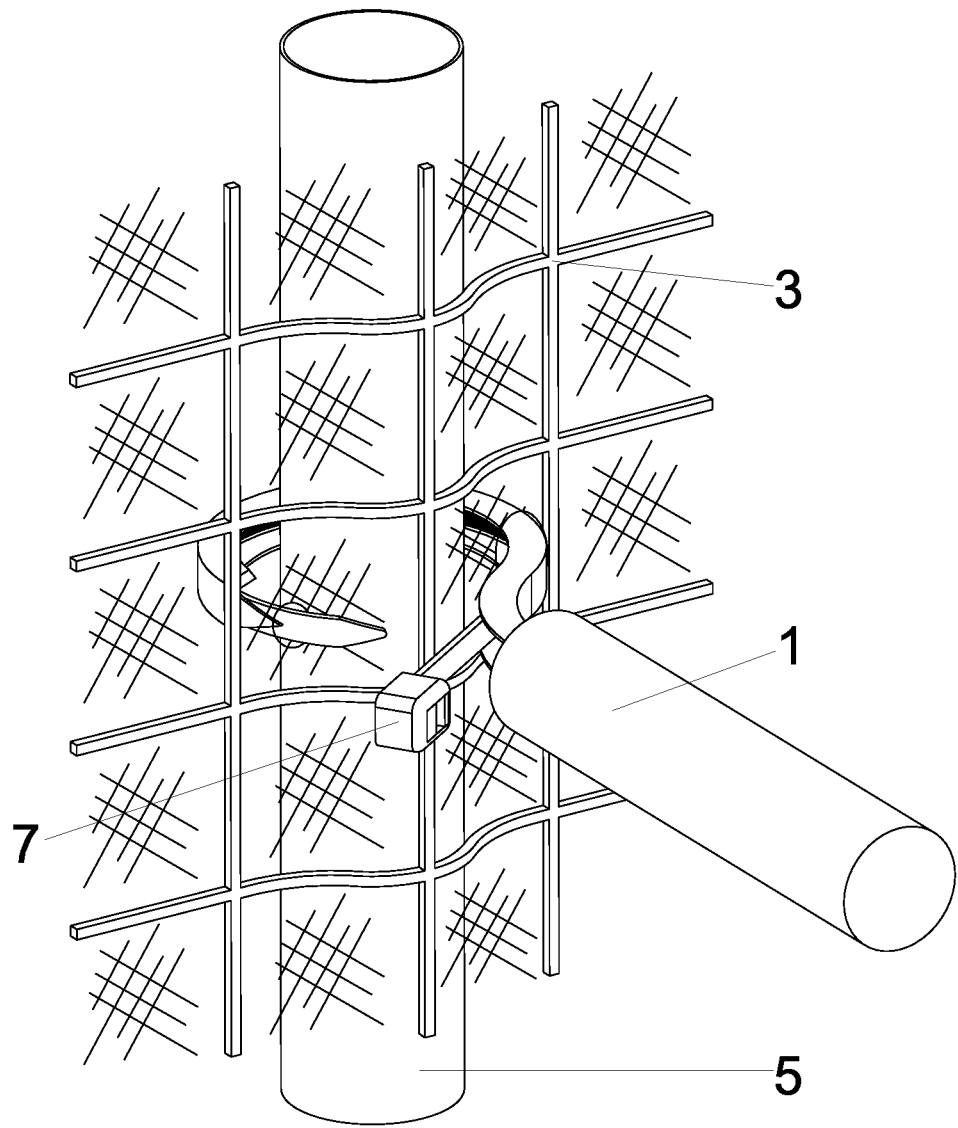
FIG. 2 depicts the fastening of mesh to a scaffolding pole
according to a second fastening system of the prior art.
Figure 4:
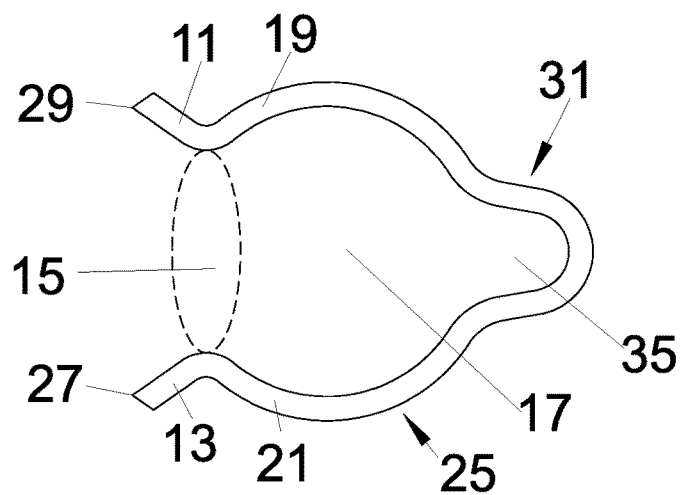
FIG. 4 depicts a scaffold clip according to a second,
preferred, embodiment of the invention.

FIG. 4 shows a preferred embodiment of a scaffolding clip
25 according to the present invention. The opposing jaws 11,
13 are tipped, in this embodiment, with sharpened outer
edge ends 27, 29, to assist with piercing of the mesh 3 in use.
The sharpened ends might be formed with other profiles to
assist piercing. Some possible profiles for the sharpened
ends 27, 29, such as a conical point, are shown in detail in
FIG. 5.

Whereas the attachment formation was provided in the
form of a wire loop 23 in the first embodiment of FIG. 3, the clip of FIG. 4 includes an attachment formation in the form of a necked portion of wire 31. The necked portion 31 comprises a biasing spring, to oppose arms 19 and 21 being brought apart, and defines a space 35 to receive a removal hook. As will be explained in more detail shortly, the spring portions 23 and 31 assist in the application and removal of the clips 9 and 25 in use.

Figure 6:
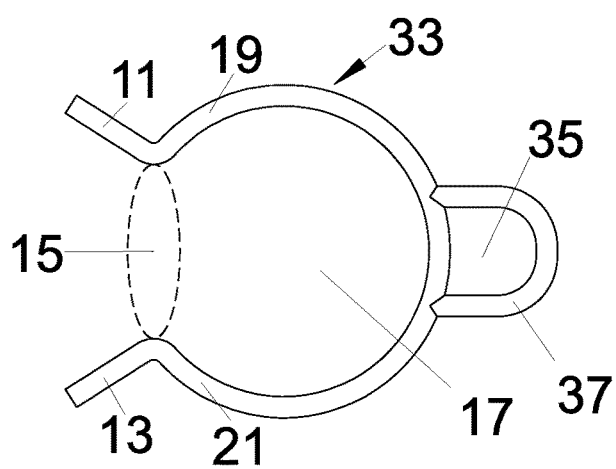
FIG. 6 depicts a scaffold clip according to a third embodiment of the invention.

While the attachment formation (e.g. item 31 in FIG. 4 and item 23 in FIG. 3), is preferably provided in the form of a biasing spring, it is not necessarily essential that it be so since the clip may be formed without a dedicated biasing spring as shown in the embodiment of FIG. 6. In FIG. 6 a clip 33 is provided with an attachment formation 37 that is not shaped to act as a biasing spring. Instead the clip 33 of FIG. 4 simply relies on the inherent spring-like characteristics of interconnected arms 21 and 19 to bias them toward each other subsequent to the pole 5 being received between them. Scaffolding clip 33 of FIG. 6 is provided with an attachment formation in the form of lug 37, welded at a position opposite the throat 15. The lug 37 is formed with an eye 35 to assist in removal of the clip from the scaffolding. As an alternative a hook might be provided instead of a lug in some further embodiments of the invention.

Figure 7:
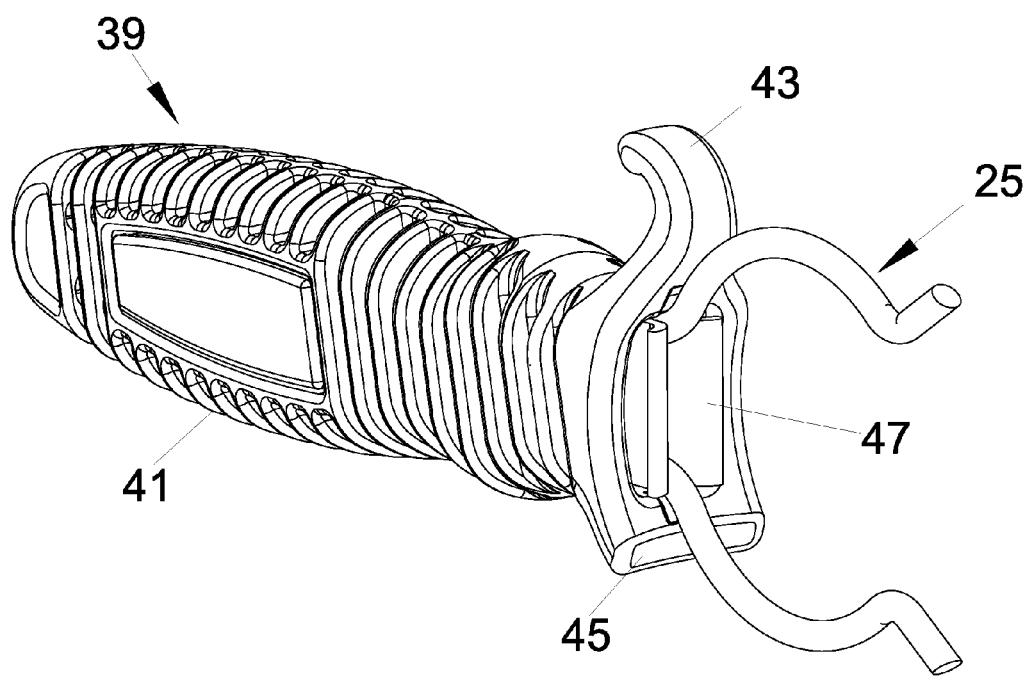
FIG. 7 depicts a scaffold clip applicator, according to an
embodiment of an aspect of the present invention, loaded
with the scaffold clip of FIG. 4.
Figure 8:
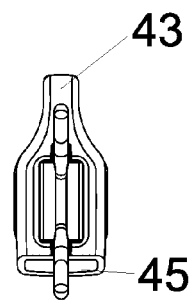
FIG. 8 is a plan front view of the applicator of FIG. 5.
Figure 9:
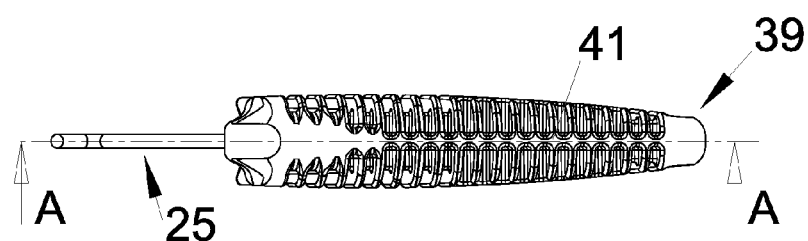
FIG. 9 is a plan view of the top of the applicator of FIG. 5.
Figure 10:
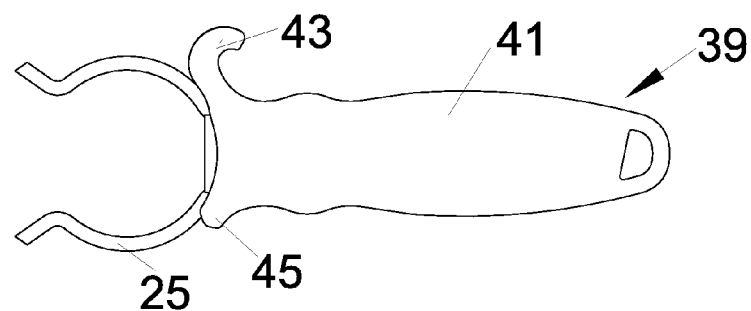
FIG. 10 is a plan view of a side of the applicator of FIG. 5.
Figure 11:
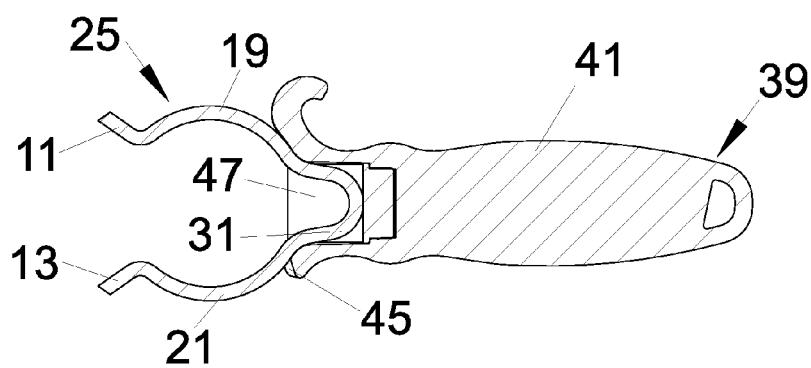
FIG. 11 is a cross section through the applicator of FIG. 5 along line A-A.

Referring now to FIG. 7, there is shown a perspective view of a scaffold clip applicator tool 39 according to a preferred embodiment of the invention and loaded with a scaffolding clip 25. It will of course be understood that the applicator tool 39 may be provided with or without the scaffold clip being fitted. Plan views of the front, top and side of the applicator are shown in FIGS. 8 to 10, while a cross sectional view is shown in FIG. 11.

The applicator tool 39 includes a handle 41, removal hook 43, removal heel 45 and socket 47 to receive attachment formation 31 of the scaffold clip 25.

Figure 12:
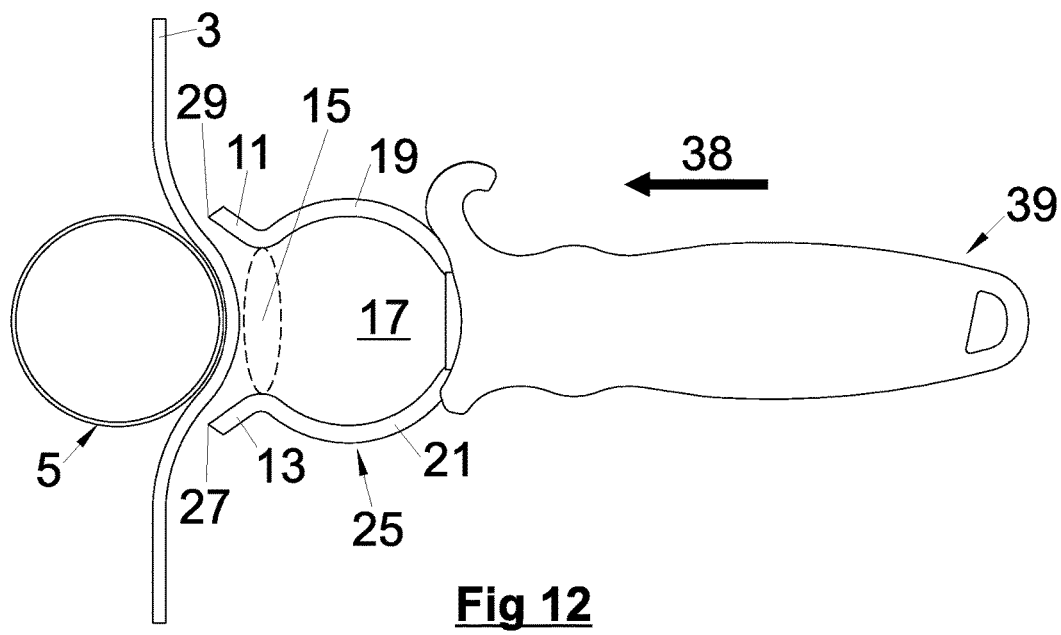
FIG. 12 depicts the applicator of FIG. 5 in use applying
the scaffold clip of FIG. 4.
Figure 13:
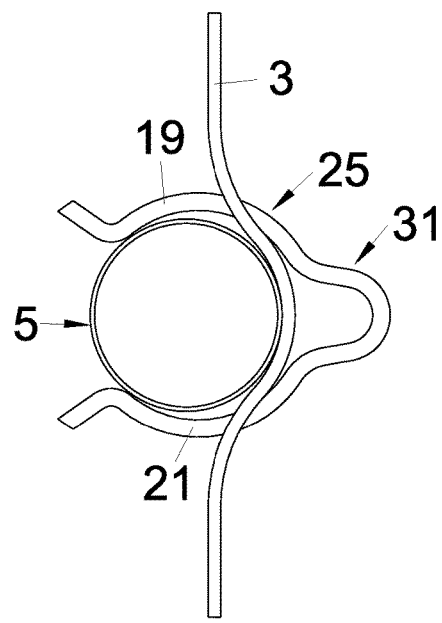
FIG. 13 is a top plan view of mesh fastened to a scaffolding pole with the scaffolding clip of FIG. 4.

FIG. 12 shows a plan elevation of the applicator tool 39 being used to push scaffold clip 25 into mesh 3, as indicated by arrow 38, and fasten it around pole 5. As the clip is pushed onto the mesh its pointed ends 27 and 29 pierce the mesh. Since the leading ends 11 and 13 are divergent, their contact with the opposing sides of the pole forces arcuate arms 21 and 19 apart so that the throat region 15 widens until, the pole is received into the pole void area 17. Upon more than half the diameter of the pole 5 having been received into the pole void area the throat 15 narrows as the arcuate arms 21 and 19 close around the mesh and the pole. Applicator 39 is then pulled off the attachment formation 31 leaving the scaffold clip 25 gripping the scaffolding pole 5 with the mesh 3 impaled by arms 19 and 21 of the clip 25 as depicted in FIG. 13.

Figure 14:
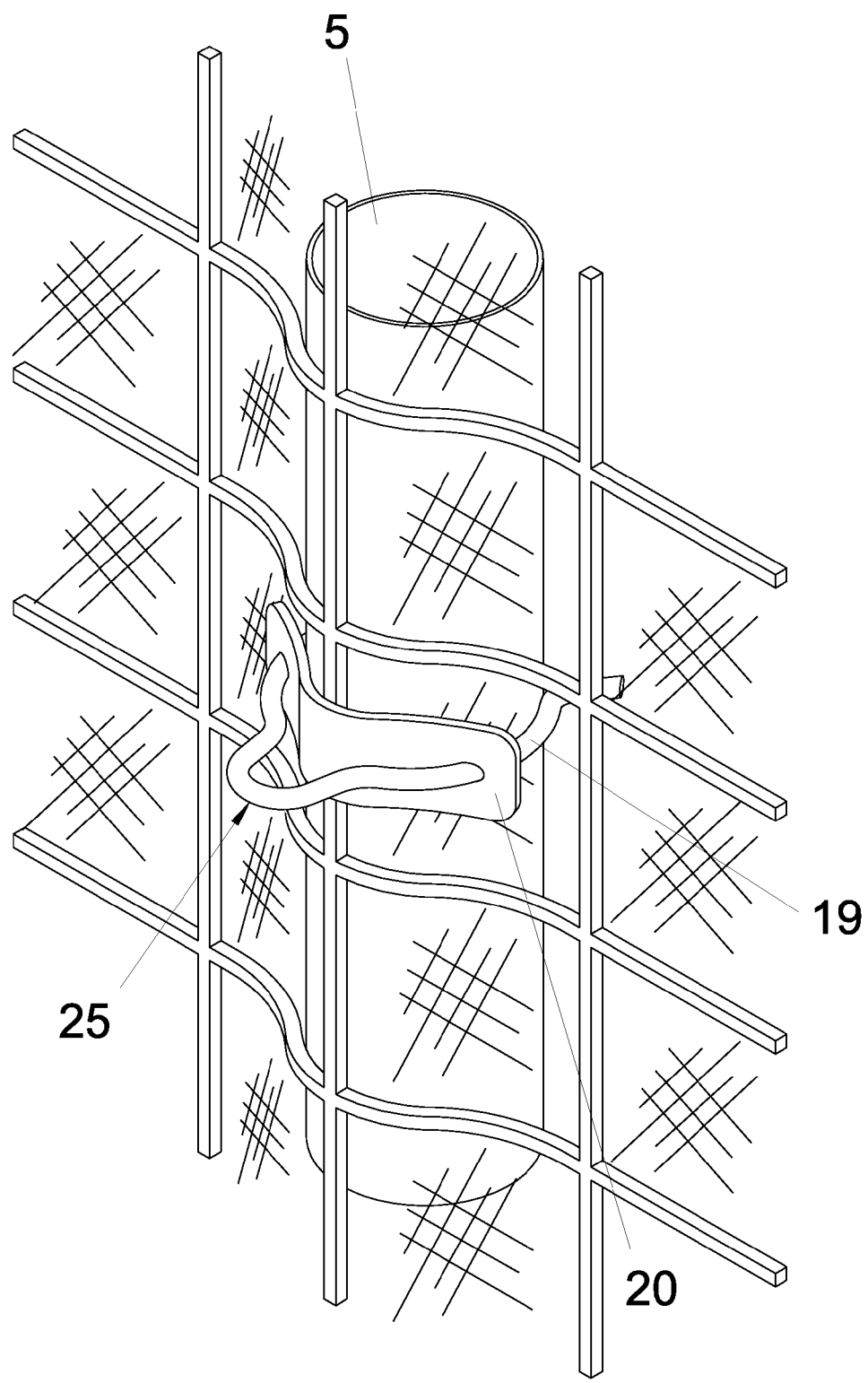
FIG. 14 is a perspective view of a mesh fastened to a
scaffolding pole with the scaffolding clip of FIG. 4 and in
addition with the assistance of an elastomeric band.

It will be realized that the socket 47 of the applicator tool comprises an engagement formation for engagement with the attachment formation of the clip, e.g. item 31 of FIG. 4. The socket 47 is sized to produce an interference fit with the plug 31 of the scaffold clip 25, so that the frictional holding force of the plug 31 with the socket 47 is less than the retaining force applied by arms 21 and 19 of the scaffolding clip to the pole 5. Otherwise, the scaffolding clip must be held and forcibly removed by hand from the applicator socket 47, which is less preferable.

Where the mesh is formed of a non-gripping material, such as Hessian for example, an elastomeric band may be used to assist in securing the mesh 3 to the pole 5. FIG. 14 shows such a situation wherein a synthetic rubber band 20 has been interposed between clip 25 and mesh 3 during application of the clip in order to better hold the mesh to the pole.

Figure 15:
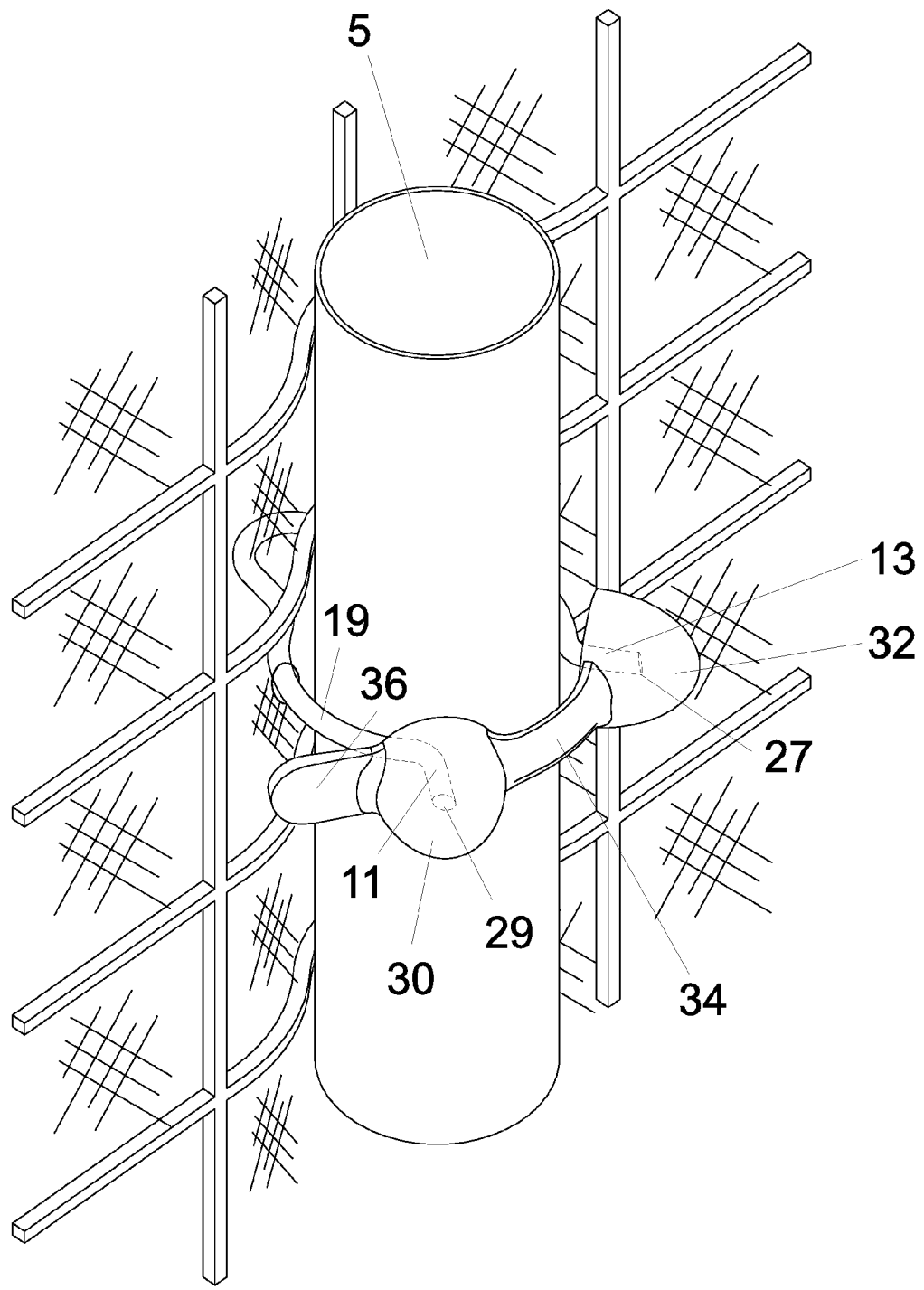
FIG. 15 is a perspective view of a mesh fastened to a
scaffolding pole with the scaffolding clip of FIG. 4 wherein
tips of the scaffolding pole have been covered with protective caps.
Figure 16:
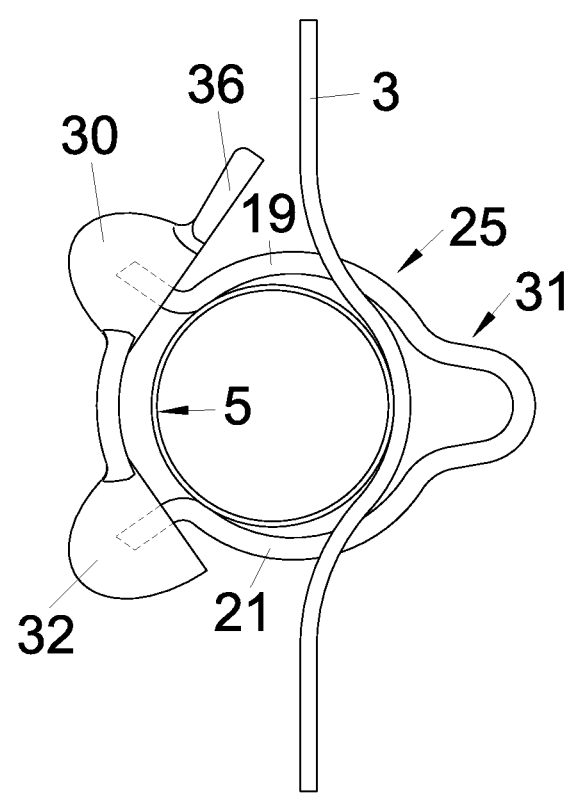
FIG. 16 is a plan view of the arrangement shown in FIG. 15.

FIGS. 15 and 16 show a further situation wherein a pair of protective rubber caps, 30 and 32 have been secured over the sharpened ends 27, 29 of the clip 25. The caps 30, 32 serve to protect workers that might inadvertently brush up against the sharpened ends and so be scratched or otherwise injured. The caps 30 and 32 are interconnected by an integrally formed band 34. A removal tab 36 is also integrally formed with cap 30 to assist in removal of the caps when the time comes to disengage the scaffolding clip from the pole 5.

Figure 17:
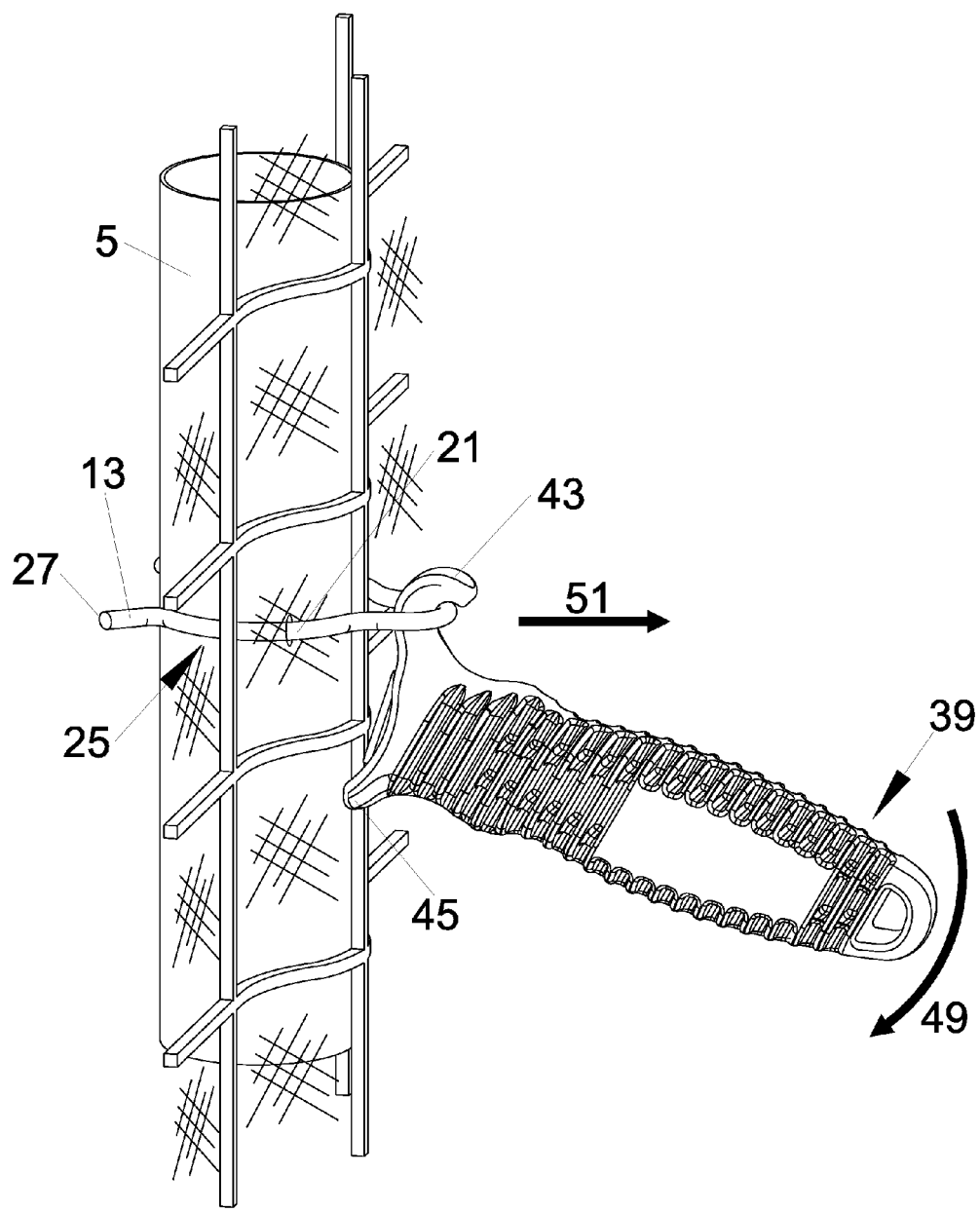
FIG. 17 is a perspective view of the applicator of FIG. 7
in use removing a scaffold clip.

Referring now to FIG. 17, when the time comes to remove the scaffolding clip 25 from pole 5, hook 43 is passed through the removal eye 35 whilst heel 45, which comprises a fulcrum, is pressed against the mesh, and thence the pole, below. Downward force is then manually applied to the applicator handle to rotate it in the direction indicated by arrow 49 so that the scaffold clip 25 is pulled, in the direction shown by arrow 51, off the pole 5.

In the preferred embodiment of the applicator 39 that is shown, the hook 43 and heel 45 are formed at the same end of the applicator as socket 47. It will be realized that in other embodiments they might be formed at an opposite end of the applicator to the socket 47.

Figure 18:
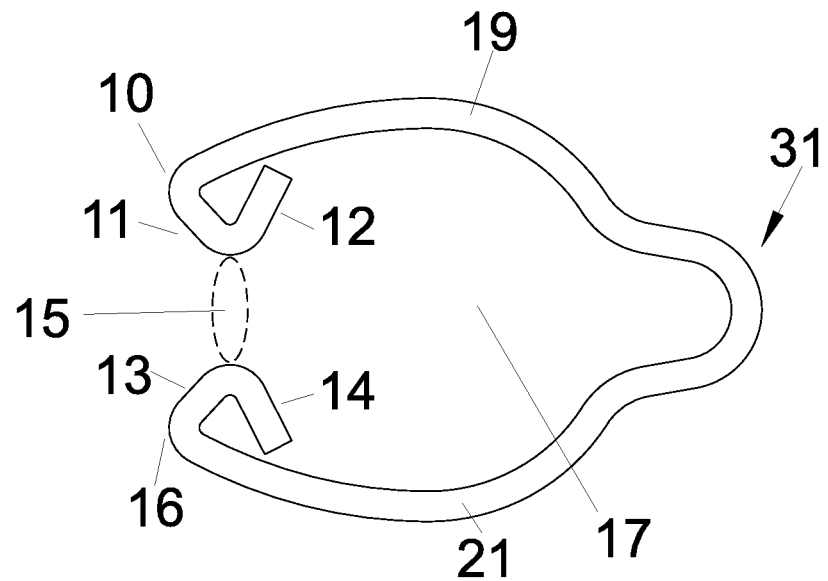
FIG. 18 depicts a scaffold clip according to a further
embodiment of the invention.

Many other variations of the invention are possible. For example, FIG. 18 shows a clip 53 being a further embodiment of the invention where the jaws 11 and 13 do not diverge outwards from throat 15 but rather are bent, at angles 10 and 12 to converge inward. In this embodiment it is the angles 10 and 16 which actually pierce the mesh during application. Each jaw 11 and 13 is further bent to form returns 12, 14 to assist during the removal of clip 53 from a scaffolding pole.

Figure 19:
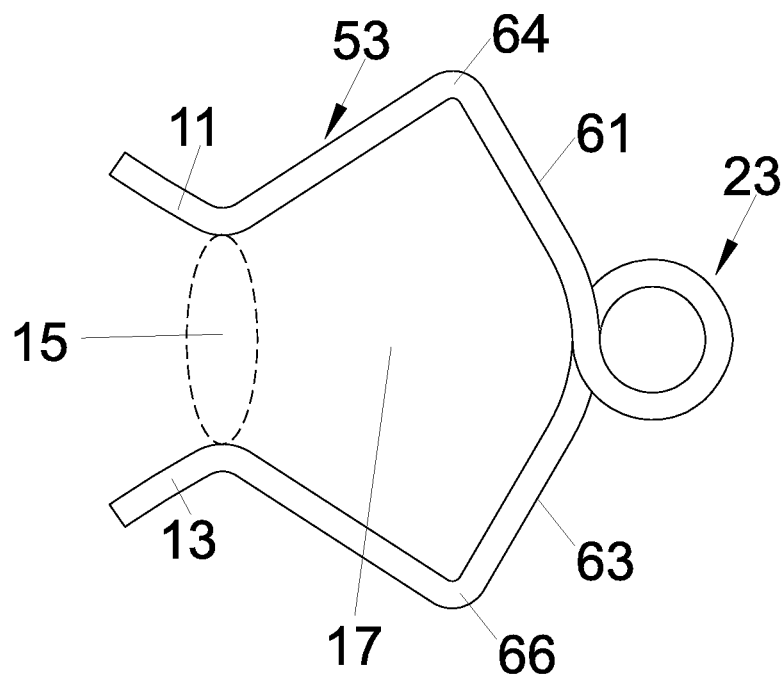
FIG. 19 is an exploded view of a scaffold hook according
to another embodiment of the invention.

A further scaffolding clip 53 according to an embodiment of the invention is shown in FIG. 19. Unlike the previous embodiments of the invention, the clip 53 has opposed arms 61 and 63 that are not arcuate. Rather, they are bent to form angles 64 and 66 with a pole void 17 defined therebetween. Such a configuration may be useful where the pole to be attached to has a square or rectangular cross-section, for example.

Figure 20:
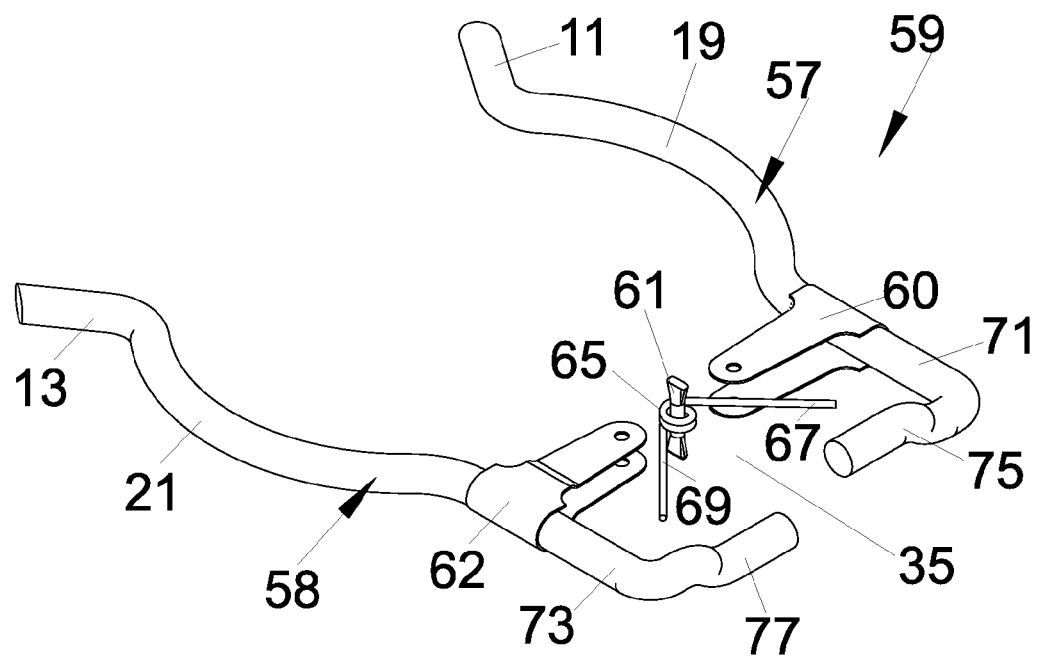
FIG. 20 depicts a scaffold clip according to yet another
embodiment of the invention.

Another variation is shown in exploded view in FIG. 20 wherein the clip 59 is formed from two separate members 57 and 58. Each member 57 and 58 is held by a respective pivot bracket 60, 62. The pivot brackets 60, 62 are pivotally connected by a pin 61. A coil spring 65 is mounted about the pin 61. Ends of the coil spring 67 and 69 abut short ends 71 and 73 of members 57, 58, thereby biasing the short ends apart and the arms 19 and 21 together. Each of the short ends 71 and 73 terminate in overlapping pincers 75 and 77. The pincers provide an attachment formation for attaching the clip 59 to an applicator tool. They also define an internal region 35 to receive a removal hook 43 of the applicator tool.

While the scaffolding clips that have been described herein are preferably made of sprung steel, other substances, be they metal or synthetic, may also be suitable.

A plurality of scaffolding clips and a scaffolding clip applicator may be sold together as a kit for fastening webbing, such as retaining mesh, to scaffolding. In a preferred embodiment a kit comprises a container, such as a bucket for example, containing a plurality of scaffolding clips and a scaffolding clip applicator tool. Tip protection caps and elastomeric bands for assisting in fastening non-gripping web to scaffolding poles can also be included in the container to complete the kit.

In the present specification and claims, the word "comprising" and its related and derivative terms, including "comprises" and "comprise", are to be interpreted in an inclusive sense as including each of the stated integers but without excluding the inclusion of one or more further integers.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

We claim:

1. A method for fastening a web to a scaffolding pole including the steps of:
    holding a fastening clip with an applicator by receiving an engagement formation of the fastening clip into a socket formed on an end of the applicator;
    locating the fastening clip on a side of the web opposite the pole, the fastening clip having spaced apart arms defining a void therebetween, the arms being continuous with opposed jaws diverging forwardly from a throat region in communication with the void;
    pushing the arms through the web;
    forcing the jaws forwardly against the pole to thereby position the opposed jaws away from each other to widen the throat region for passage of the pole therethrough;
    advancing the arms and jaws forwardly to pass the pole through the throat region into the void, whereby the arms locate about opposite sides of the pole and whereby, upon the post having passed into the void, the throat narrows thereby holding the web to the scaffolding pole with the clip; and
    disengaging the applicator from the clip subsequent to piercing the web by application of sufficient force to the applicator to remove the socket from said engagement formation of the clip without overcoming the holding of the web to the scaffolding with the arms.

2. The method of claim 1, including releasing the arms from the pole to thereby release the web from the scaffolding pole.

3. The method of claim 2, wherein the step of releasing the arms from the pole comprises levering the clip from the pole.

4. The method of claim 3, wherein the step of levering the clip from the pole includes a step of inserting a hook of the applicator between the clip and the pole.

5. The method of claim 4, wherein the step of levering the clip from the pole includes pivoting a portion of the applicator about the pole.

6. The method of claim 1, including a step of disposing an elastomeric band between the arms of the scaffolding clip for assisting in holding the web to the scaffolding pole with the arms.

7. The method of claim 1, including placing protective caps over ends of the arms subsequent to pushing the arms through the web.

* * * * *